(12) United States Patent
Neal et al.

(10) Patent No.: US 12,364,252 B2
(45) Date of Patent: Jul. 22, 2025

(54) DEVICE INSTALLATION STRUCTURE FOR DETACHABLE PET PRODUCTS, PET LEASH, AND PET TETHERING ROPE

(71) Applicant: TUG PET PRODUCTS, LLC., Raleigh, NC (US)

(72) Inventors: Timothy Neal, Toa Baja, OR (US); Zhichao Ye, Shanghai (CN)

(73) Assignee: TUG PET PRODUCTS, LLC., Raleigh, NC (US)

( * ) Notice: Subject to any disclaimer, the term of this patent is extended or adjusted under 35 U.S.C. 154(b) by 106 days.

(21) Appl. No.: 18/453,503

(22) Filed: Aug. 22, 2023

(65) Prior Publication Data
US 2024/0065232 A1 Feb. 29, 2024

(30) Foreign Application Priority Data
Aug. 23, 2022 (CN) .......................... 202222229706.8

(51) Int. Cl.
*A01K 27/00* (2006.01)

(52) U.S. Cl.
CPC .......... *A01K 27/008* (2013.01); *A01K 27/006* (2013.01)

(58) Field of Classification Search
CPC ......................... A01K 27/008; A01K 27/006
See application file for complete search history.

(56) References Cited

U.S. PATENT DOCUMENTS

| | | | |
|---|---|---|---|
| 8,960,948 B2 * | 2/2015 | Ford | A01K 27/006 362/108 |
| 9,155,287 B2 * | 10/2015 | Messner | B65H 75/4431 |
| 2003/0154931 A1 * | 8/2003 | Ostrowiecki | E01H 1/1206 119/796 |

* cited by examiner

*Primary Examiner* — Kristen C Hayes
(74) *Attorney, Agent, or Firm* — Maier & Maier, PLLC

(57) ABSTRACT

A device installation structure for detachable pet products, a pet leash, and a pet tethering rope may be provided. The structure may include a detachable device installation structure; an elastic hook, including an elastic extension portion mounted on the detachable device and extending outward; a first bending portion located at the end of the elastic extension portion and bent towards the direction close to the detachable device; a second bending portion located at the end of the first bending portion and bent towards the direction away from the detachable device.

1 Claim, 16 Drawing Sheets

DEVICE INSTALLATION STRUCTURE FOR DETACHABLE PET PRODUCTS, PET LEASH, AND PET TETHERING ROPE

BACKGROUND

With the improvement of living standards, more and more people and families are keeping pets. Among pet products, those suitable for dogs are an important area due to the exceptional loyalty and close relationship between dogs and humans. Traditional elastic pet leashes/leads (commonly known as dog leashes/leads) that allow slight stretching due to elastic deformation, as well as retractable pet leashes/leads with automatic storage devices that can freely extend and retract, along with dedicated accessories such as pet harnesses and collars, dominate the pet product industry, primarily because dogs are active and require frequent outdoor activities with their owners.

To expand the functionality of pet leashes/leads, pet owners commonly use flexible connecting structures to attach detachable devices as detachable and removable external functional modules or accessories (such as lights, dispensers, external storage containers, etc.) to pet leashes/leads or pet collars. For example, a light can be attached to a pet leash/lead or pet collar for illumination or safety warning during nighttime walks, enhancing the visibility of both the pet and the owner. During regular walks, detachable external storage containers or dispensers connected to the pet leash/lead can be used to store and distribute waste bags for convenient disposal of pet waste or to store and dispense specialized pet food.

However, the reliability of the connection between lights, dispensers, or external storage containers attached to pet leashes/leads or pet collars using flexible connecting structures is relatively low, and the assembly and disassembly process is inconvenient. During dog walks, these attachments tend to sway and shake at the connection point with the pet leash/lead due to the movement of the pet and the owner. This can easily distract both the pet and the owner, leading to safety hazards during the walk.

In the prior art, there have been attempts to use rigid connecting structures on retractable pet leashes/leads to attach detachable devices (such as lights, dispensers, external storage containers, etc.) as external functional modules. However, these rigid connecting structures typically directly mount the detachable devices onto the handle casing of the retractable pet leash/lead. This rigid connection poses inconvenience in terms of detachment and assembly of the detachable devices. Additionally, when there is no need to use the detachable devices for expanding the functionality or when removing them from the rigid connection structure of the retractable pet leash/lead, the exposed rigid connection structure on the surface of the handle casing affects the overall appearance and aesthetics of the product, thereby compromising the user experience. Furthermore, traditional elastic pet leashes/leads, which rely on elastic deformation for slight stretching, are not suitable for connection with detachable devices through rigid connecting structures.

Therefore, in the existing technology, connecting detachable devices flexibly to elastic pet leashes/leads leads to low reliability and easy shaking during movement. On the other hand, connecting detachable devices rigidly to the surface of the casing of retractable pet leashes/leads results in the exposed connection structure affecting the appearance when removing the detachable devices. These are pressing technical issues that need to be addressed in this field.

SUMMARY

A detachable device installation structure for pet products may be provided, comprising:

Detachable device;

Elastic hook, comprising: an elastic extension part installed on the detachable device and extending outwardly away from the detachable device; a first bending part located at the end of the elastic extension part, away from the detachable device, and bending towards the direction closer to the detachable device; a second bending part located at the end of the first bending part, away from the elastic extension part, and bending away from the detachable device, forming an overall S-shaped winding structure;

Mounting socket, installable on the pet product; side frame, located at the top of the mounting socket, with one side of the side frame having an opening that matches the size of the S-shaped winding structure; top cover, covering the top of the side frame, enclosing an internal storage space between the top cover, side frame, and mounting socket;

Elastic protrusion, located at the top of the mounting socket and within the internal storage space, the S-shaped winding structure can be inserted into the internal storage space through the opening and lock with the elastic protrusion by abutting the end of the second bending part, away from the first bending part, against the protruding end surface of the elastic protrusion.

Furthermore, the mounting socket is provided with a through groove that passes through the mounting socket and communicates with the internal storage space, and the elastic protrusion is located at the intersection of the side wall of the through groove, near the opening, and the top of the mounting socket, with the protruding end surface positioned inside the through groove.

Preferably, the surface of the elastic protrusion facing away from the mounting socket is an arc-shaped transition surface, and one end of the arc-shaped transition surface, away from the opening, is connected to one end of the protruding end surface, near the top cover, while the other end of the arc-shaped transition surface intersects with the top of the mounting socket.

Furthermore, the elastic protrusion is located at one end of the internal storage space, away from the opening, and multiple first ribs are spaced apart between the top of the mounting socket and the elastic protrusion, with the two ends of the first ribs extending correspondingly towards the elastic protrusion and the opening.

On the inner side of the top cover facing the mounting socket, multiple second ribs are spaced apart, parallel to and corresponding with the multiple first ribs.

The opening, first ribs, second ribs, arc-shaped transition surface, and through groove form an insertion channel located within the internal storage space and matching the external shape of the S-shaped winding structure.

The length of the first rib is shorter than that of the second rib, and one end of the first rib, away from the opening, abuts against the arc transition surface or is flush with the intersection of the arc transition surface and the top of the mounting seat.

Furthermore, the channel extends away from the opening and traverses the side wall of the side frame facing the opening, forming a demolding channel that extends from the outside of the side frame, away from the opening, and reaches the end face of the elastic protrusion facing away from the opening.

Additionally, the top cover, side frame, and mounting seat are integrally formed by injection molding, and the top cover has a mold groove that penetrates the top cover and is used for mold release, located opposite the channel.

A pet leash may be provided, comprising a strap leash portion and a collar connecting portion attached to one end of the strap leash portion. It further includes the aforementioned detachable device installation structure for pet products. The detachable device installation structure for pet products also includes an elastic clamping portion set opposite the mounting seat. The top of the mounting seat is located on the outer side of the elastic clamping portion, and one end of the mounting seat and the elastic clamping portion correspondingly combine into one body through a U-shaped bending portion. Multiple anti-slip ridges are spaced apart on the corresponding inward-facing surfaces of the mounting seat and the elastic clamping portion. The mounting seat and the elastic clamping portion can be detachably secured to the strap leash portion by the elastic closing action of the U-shaped bending portion.

Moreover, the anti-slip ridges are parallel to the strap leash portion and are arranged in an alternating pattern between the corresponding anti-slip ridges of the mounting seat and the elastic clamping portion.

Furthermore, a pet lead may be provided, comprising: a housing consisting of a bottom shell and a top shell; a retractable leash device located inside the housing. It further includes a storage inner shell located inside the housing, which includes the aforementioned detachable device installation structure for pet products. The top cover serves as the top cover of the storage inner shell facing the top shell, and the top end of the side frame is suspended and connected to the bottom side of the top cover, away from the top shell. The mounting seat is a covering installed on the bottom end of the side frame, away from the top shell. The elastic protrusion is located at the top of the hanging seat plate. The internal accommodating space is enclosed by the top cover of the storage inner shell facing the top shell, the side frame, and the hanging seat plate.

The storage inner shell, facing the top shell, is provided with a first clearance opening, and the top shell is provided with a second clearance opening facing the first clearance opening. The S-shaped winding body can pass through the second clearance opening, then the first clearance opening, extend into the storage inner shell, and insert into the internal accommodating space through the opening. It is locked by abutting against the elastic protrusion at the end of the second bending portion, away from the first bending portion, thus tightly securing the detachable device to the top cover of the top shell.

The proposed installation structure of the detachable device for pet products, the pet leash, and the pet leash rope may have the following beneficial effects compared to the existing technology: The installation structure of the detachable device for pet products allows the quick connection and detachment of detachable devices such as lighting lamps, dispensers, external storage containers, etc. to elastic pet leashes, retractable pet leash ropes, or pet collars. It employs an elastic connection structure that enables quick and reliable detachable connections through elastic variations. When applied to a regular elastic pet leash, the elastic connection structure provides a firm and controllable connection, thus overcoming the problem of unreliable connections and shaking at the connection point caused by traditional flexible connection structures. When applied to a retractable pet leash, it offers convenience in assembly and disassembly, and the elastic connection structure can be concealed inside the inner side of the retractable pet leash rope's casing, thereby avoiding the inconvenience of rigid connection structures in traditional designs and the impact of rigid connection structures left on the surface of the retractable pet leash rope's casing after removing the detachable device, which affects the overall appearance of the product.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Figure 1:
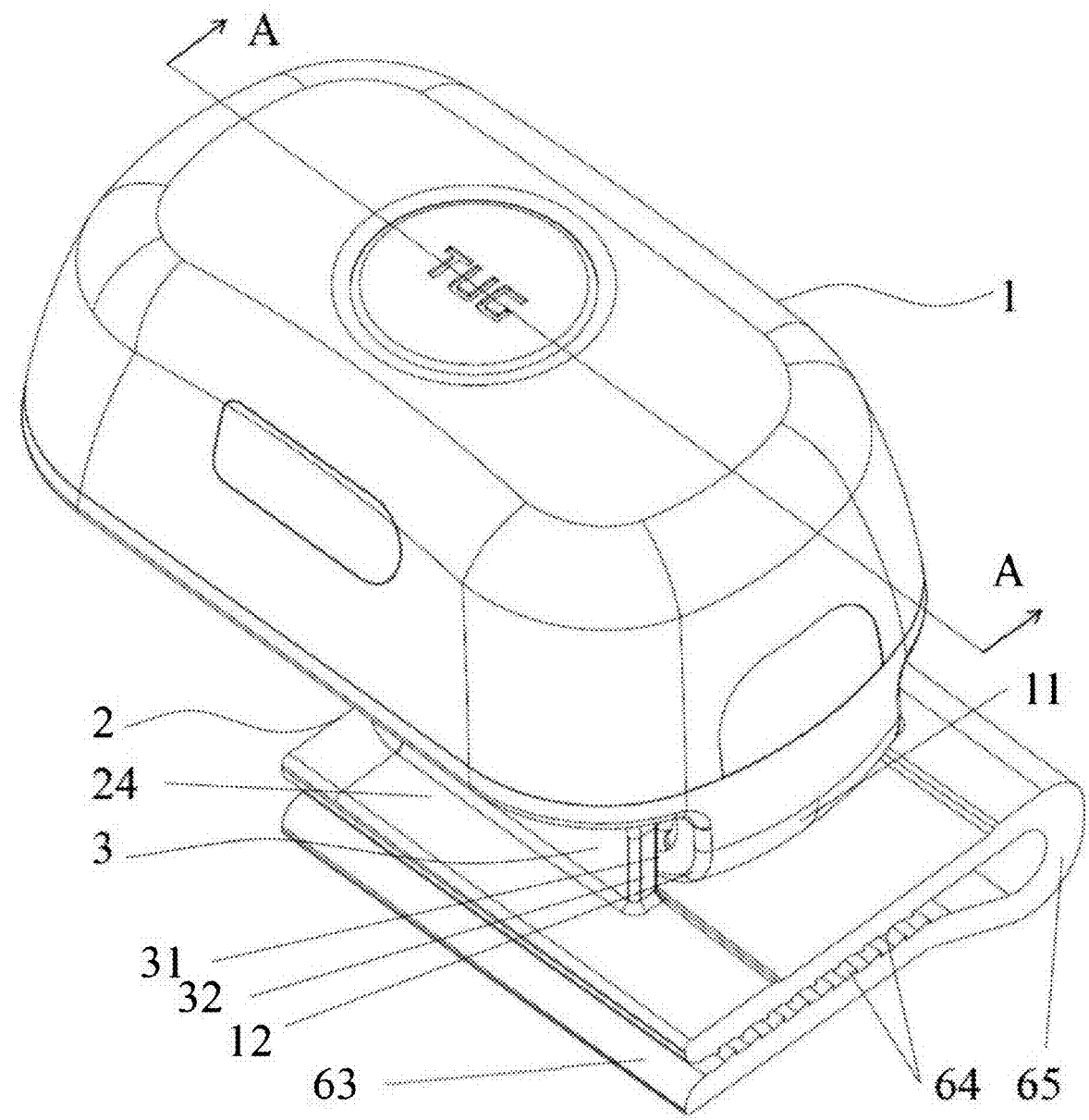
FIG. 1 is a schematic diagram of the overall assembly structure of the installation structure of the detachable device for pet products in the embodiments.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

In the figures, the main labels are as follows:
1. Detachable device; 11. Elastic extension part; 12. First bending part; 13. Second bending part; 131. First inclined surface; 2. Installation base; 21. Elastic protrusion; 211. Arc transition surface; 212. Protrusion end surface; 22. Through groove; 221. Side wall; 23. First rib; 24. Top end surface; 3. Side frame; 31. Opening; 32. Side frame wall; 4. Top cover; 41. Second rib; 411. Second inclined surface; 42. Mold groove; 43. Inner end surface; 5. Internal storage space; 6. Pet leash; 61. Strap traction part; 62. Collar connection part; 63. Elastic clamping part; 64. Anti-slip rib; 65. U-shaped bending part; 7. Pet leash rope; 71. Casing; 711. Bottom shell; 712. Top shell; 713. Second clearance; 72. Leash rope retracting device; 8. Storage inner shell; 81. Top cover; 811. First clearance; 83. Guide rib.

In order to make the technical problems, technical solutions, and beneficial effects to be solved by the present utility model clearer and more understandable, the principles and structures of the present utility model will be further described in detail below in conjunction with FIGS. 1-20 and embodiments. It should be understood that the specific embodiments described here are only used to explain the present utility model and are not intended to limit the present utility model.

Please also refer to FIGS. 1-8. An installation structure of a detachable device for pet products is provided, including: a detachable device 1, which is used as an externally detachable and detachable functional module or accessory for pet products. The detachable device 1 can specifically be an illumination lamp, a distributor, an external storage container, and so on. The elastic hook includes an elastic extension part 11, which is installed on the detachable device 1 and extends outwardly from the detachable device 1 in a direction away from the detachable device 1; a first bending part 12, which is located at the far end of the elastic extension part 11 away from the detachable device 1 and bends toward the direction closer to the detachable device 1; and a second bending part 13, which is located at the far end of the first bending part 12 away from the elastic extension part 11 and bends away from the detachable device 1. The second bending part 13 and the first bending part 12 are connected to form a winding S-shaped whole. In this embodiment, the elastic hook is integrally molded with the S-shaped winding (including the elastic extension part 11 and the first bending part 12), and the elastic extension part 11 can be integrally molded with the main body of the detachable device 1 (such as a lamp base, a box body, etc.). It can also be detachably installed on the detachable device 1 through connection structures such as snaps, threaded fasteners, or through welding, bonding, and other connection processes.

The installation structure of the detachable device for pet products provided by the present utility model also includes an installation base 2. The installation base 2 can be detachably installed on the pet product through connection structures such as snaps, threaded fasteners, or through welding, bonding, and other connection processes. A side frame 3 is provided at the top of the installation base 2, and the top of the installation base 2 preferably has a top end surface 24. The side frame 3 has a structure with three sides closed and one side open with an opening 31 that matches the size of the S-shaped winding of the elastic hook on one side of the side frame 3, and the other three directions are formed by three side frame walls 32 that are connected to form a U-shaped whole with an open end. A top cover 4 is provided, and the inner side of the top cover 4 preferably has an inner end surface 43 facing the installation base 2. The top cover 4 covers the top of the side frame 3, and an internal storage space 5 is formed between the top cover 4, the side frame 3, and the installation base 2. The internal storage space 5 is separated from the outside world and is only connected to the outside through the opening 31 on one side of the side frame 3. An elastic protrusion 21 is provided, which is located on the top end surface 24 and inside the internal storage space 5. The S-shaped winding of the elastic hook can be inserted into the internal storage space 5 from the opening 31 and abuts against the protrusion end surface 212 facing away from the opening 31 on the elastic protrusion 21, thereby securely holding the first bending part 12 in the internal storage space 5, achieving interlocking between the detachable device 1 and the installation base 2 in the internal storage space 5.

Please also refer to FIGS. 2-4, 5, and 8. In this embodiment, the installation base 2 is provided with a through groove 22 that extends along the thickness direction of the installation base 2 (perpendicular to the direction of the top end surface 24) and communicates with the internal storage space 5. The elastic protrusion 21 is located at the intersection (intersection line) between the side wall 221 near the opening 31 and the top end surface 24 of the installation base 2, and the protrusion end surface 212 is located in the through groove 22. The through groove 22 can enhance the elasticity of the elastic protrusion 21 at the intersection between the side wall 221 and the top end surface 24, thereby improving the interlocking effect between the elastic protrusion 21 and the first bending part 12, ensuring the stability and reliability of the connection between the detachable device 1 and the installation base 2 in the internal storage space 5.

Figure 2:
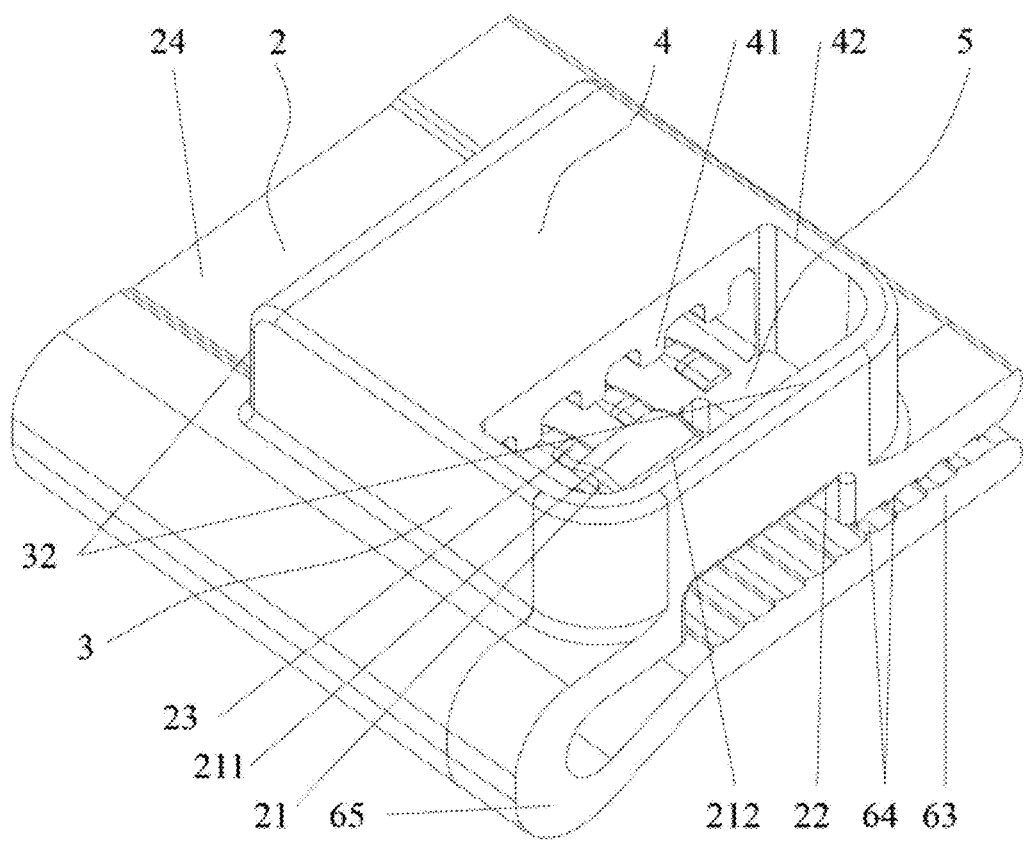
FIG. 2 is a three-dimensional structural schematic diagram of the installation base, side frame, and top cover of the installation structure of the detachable device for pet products in the embodiments.
Figure 3:
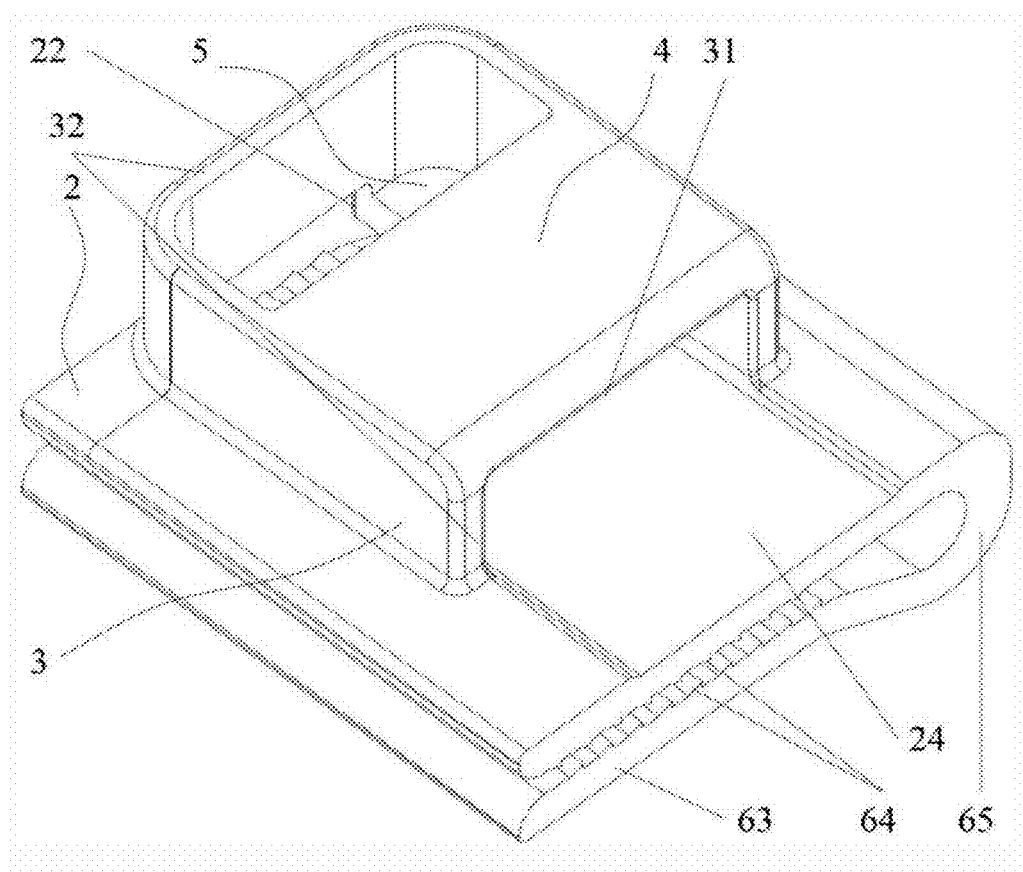
FIG. 3 is a three-dimensional structural schematic diagram of the installation base, side frame, and top cover of the installation structure of the detachable device for pet products in the embodiments.
Figure 4:
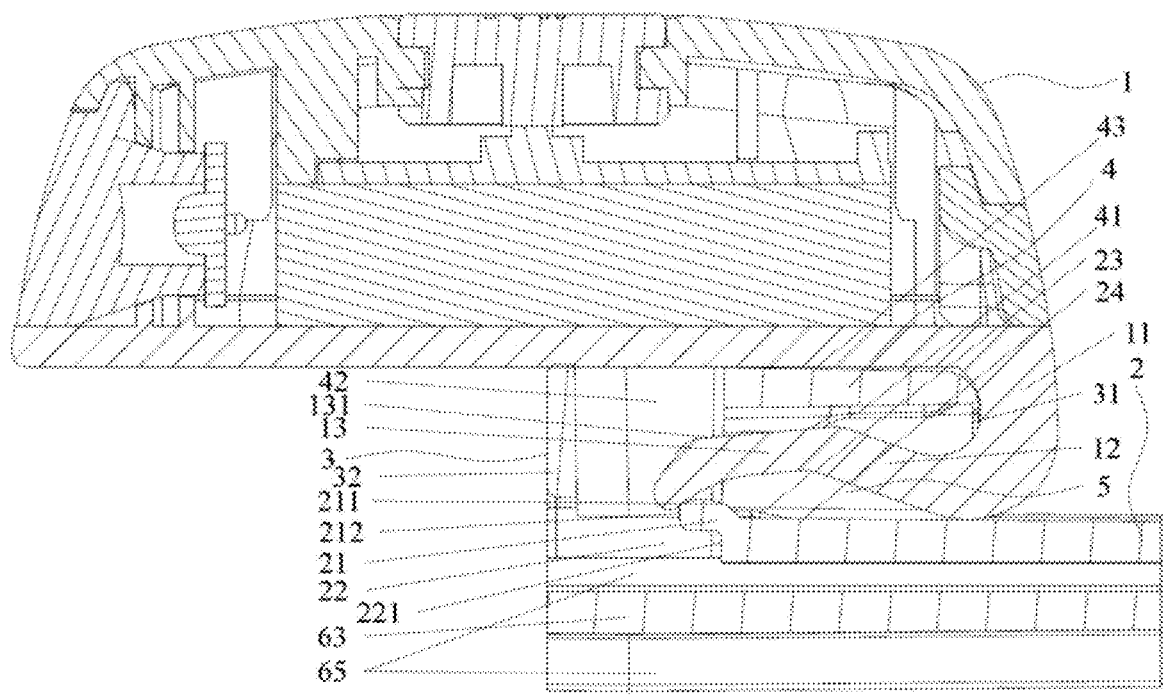
FIG. 4 is a sectional structural schematic diagram of FIG. 1 along the direction of A-A.
Figure 5:
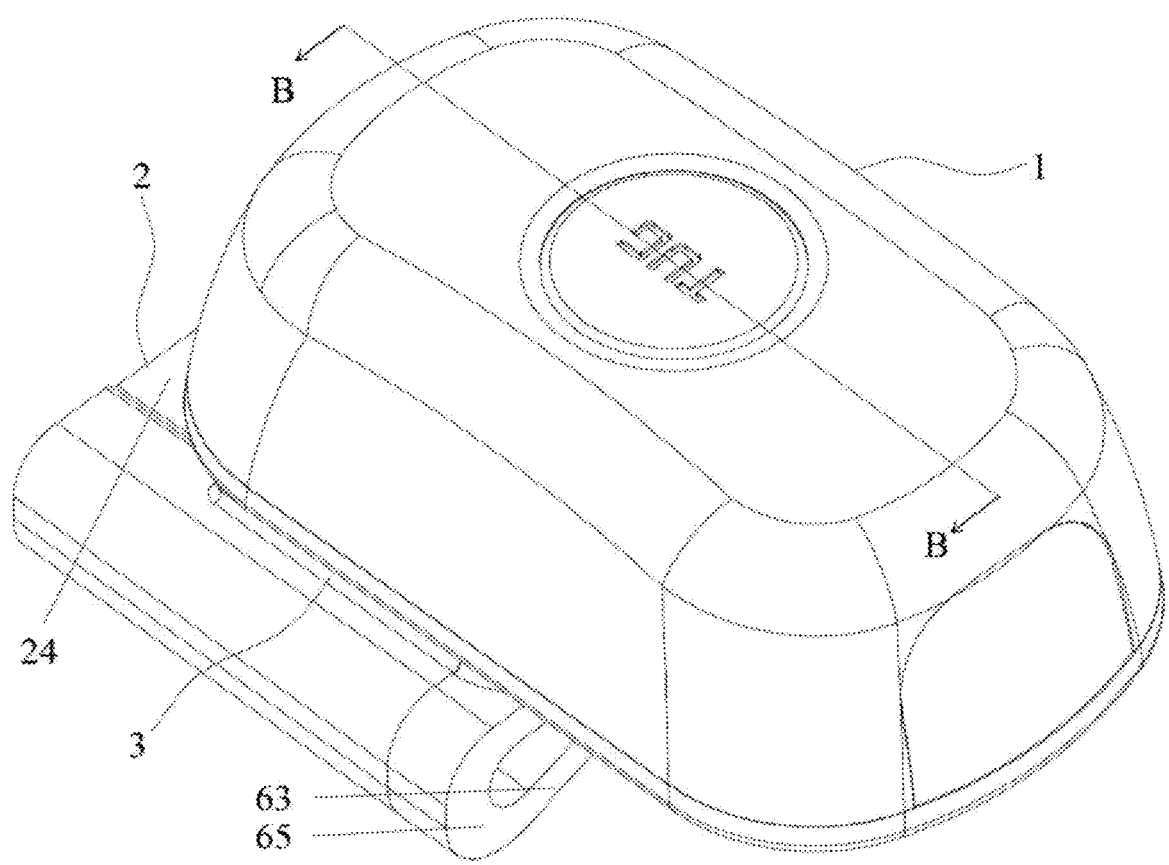
FIG. 5 is a schematic diagram of the overall assembly structure of the installation structure of the detachable device for pet products in the embodiments.
Figure 6:
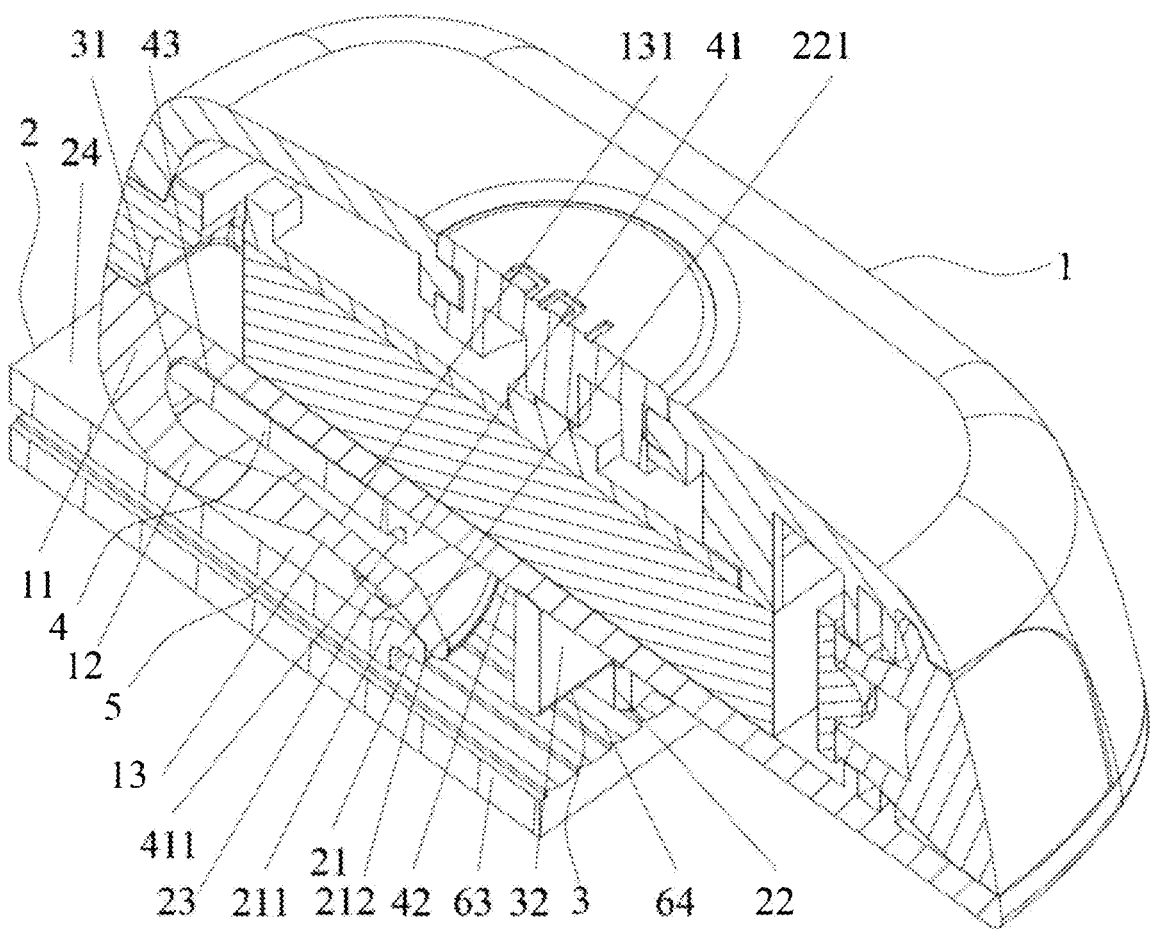
FIG. 6 is a sectional structural schematic diagram of FIG. 5 along the direction of B-B.
Figure 7:
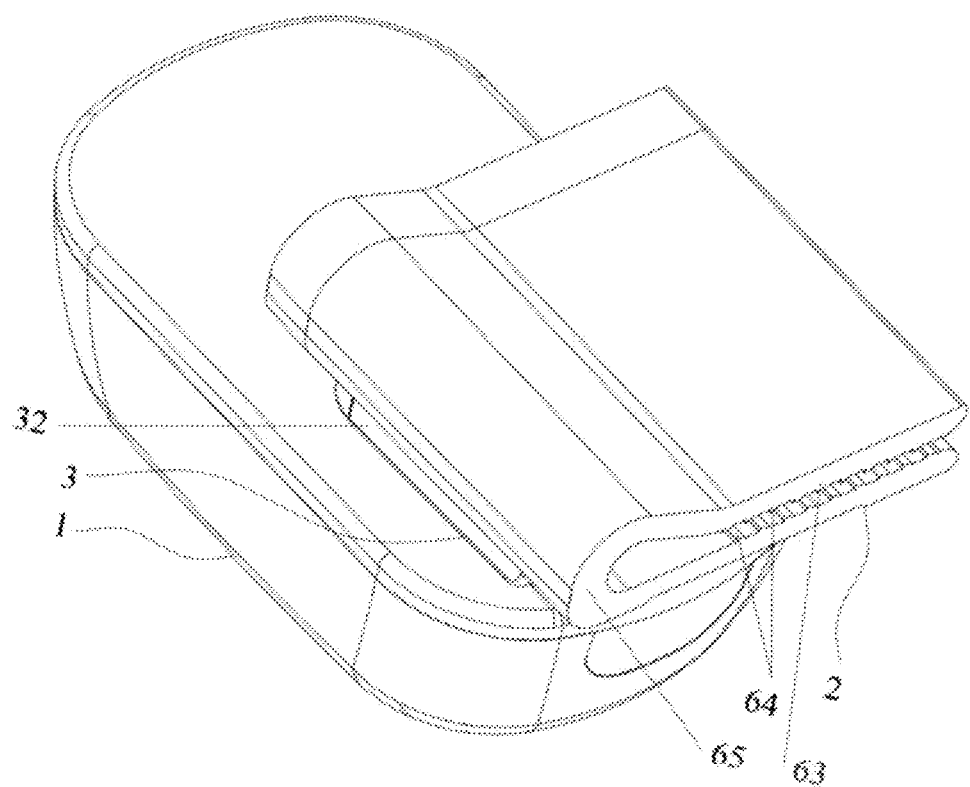
FIG. 7 is a schematic diagram of the overall assembly structure of the installation structure of the detachable device for pet products in the embodiments.
Figure 8:
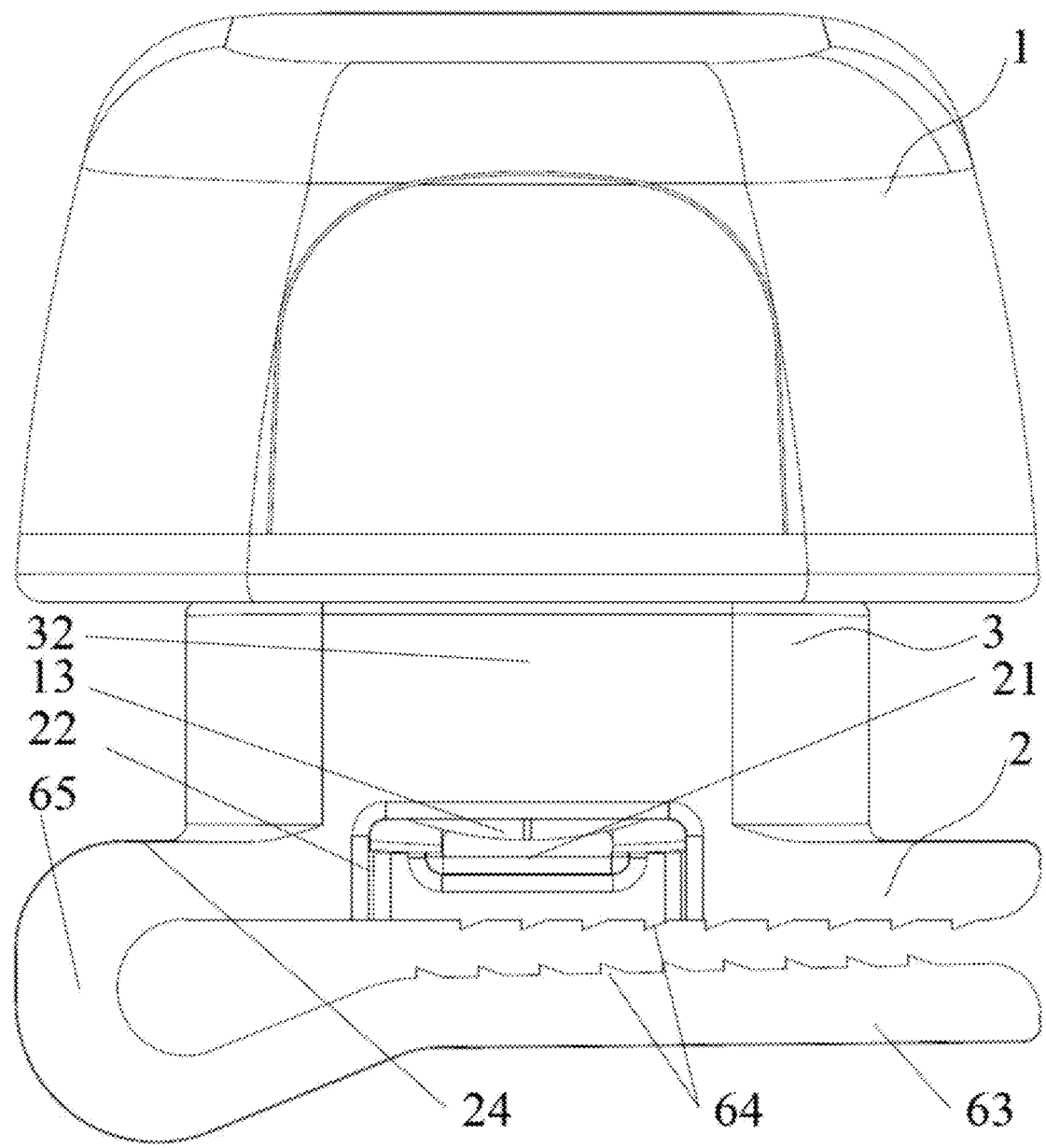
FIG. 8 is a side view of the overall assembly structure of the installation structure of the detachable device for pet products in the embodiments.
Figure 9:
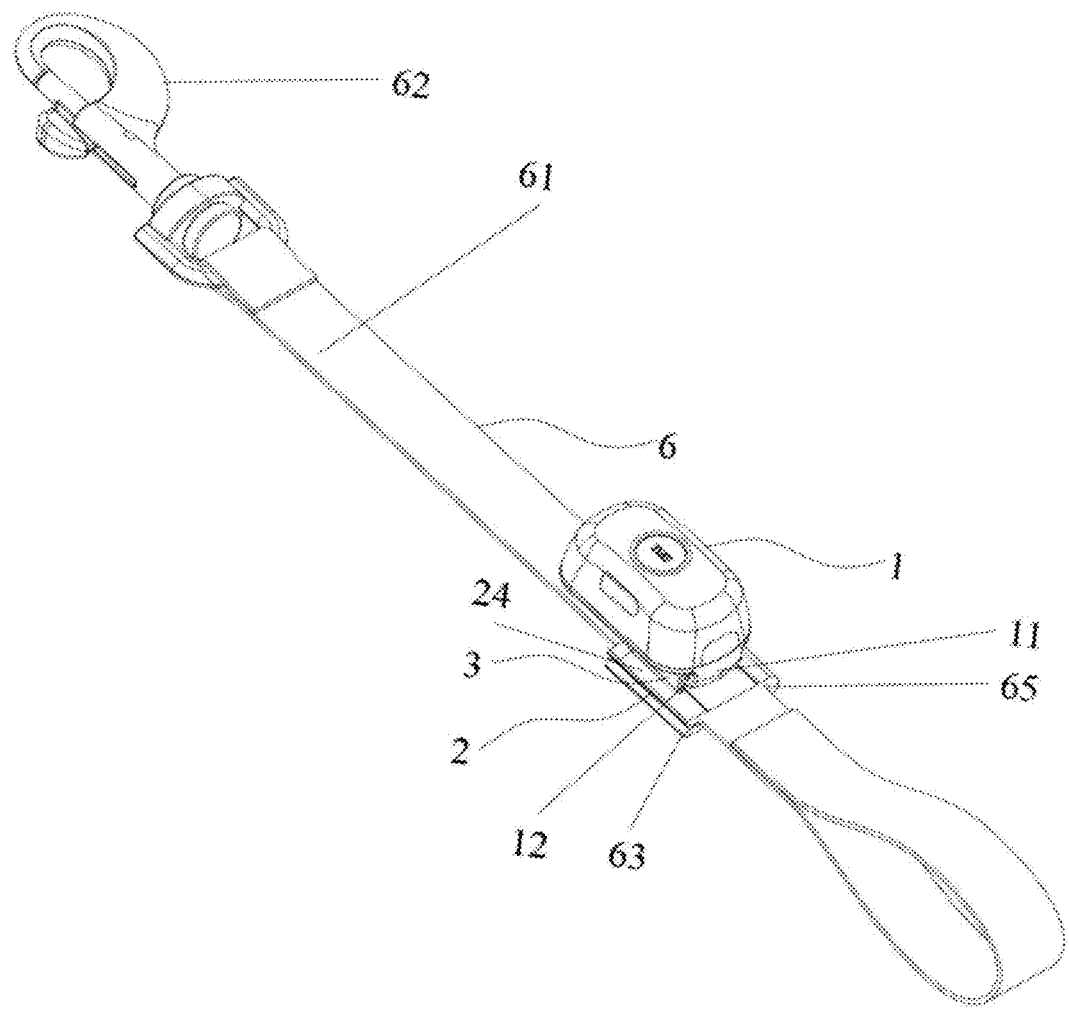
FIG. 9 is a schematic diagram of the overall assembly structure of the pet leash and the installation structure of the detachable device for pet products in the embodiments.
Figure 10:
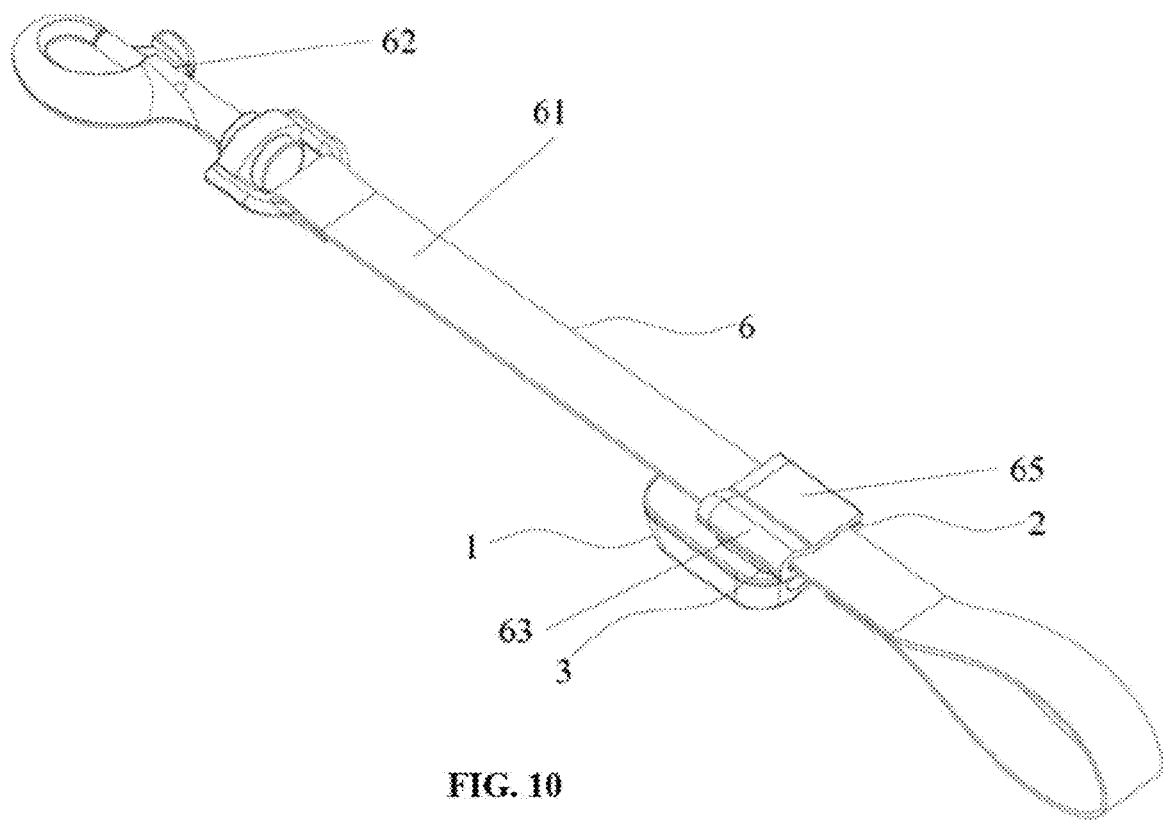
FIG. 10 is a schematic diagram of the overall assembly structure of the pet leash and the installation structure of the detachable device for pet products in the embodiments.
Figure 11:
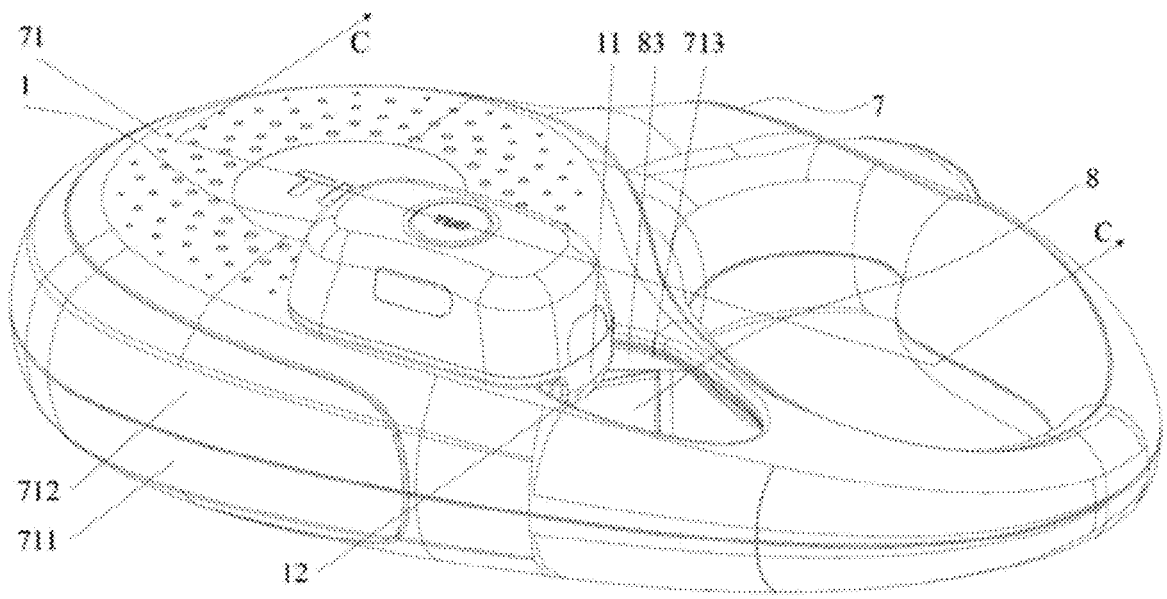
FIG. 11 is a schematic diagram of the overall assembly structure of the pet leash rope and the installation structure of the detachable device for pet products in the embodiments.
Figure 12:
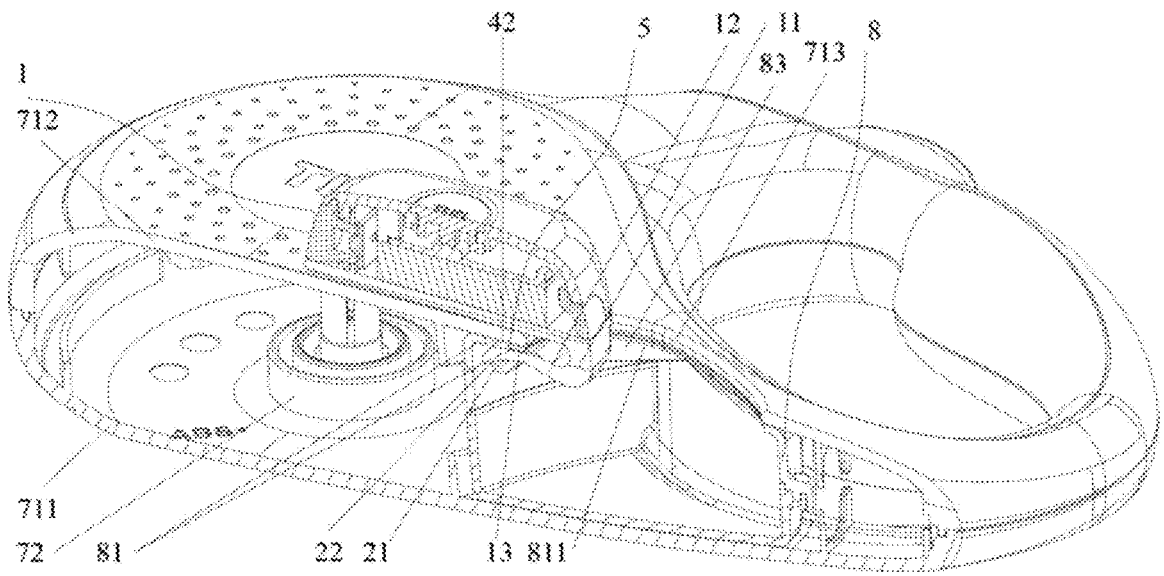
FIG. 12 is a sectional structural schematic diagram of FIG. 11 along the direction of C-C.
Figure 13:
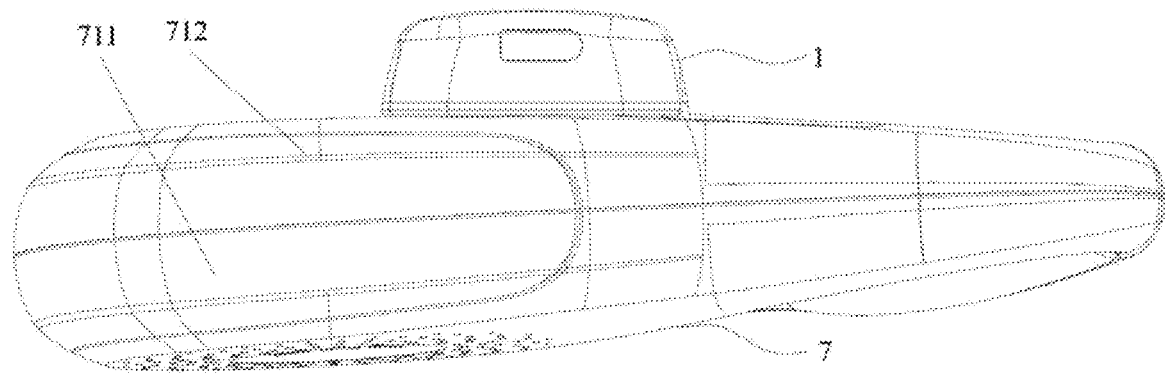
FIG. 13 is a front view of the overall assembly structure of the pet leash rope and the installation structure of the detachable device for pet products in the embodiments.
Figure 14:
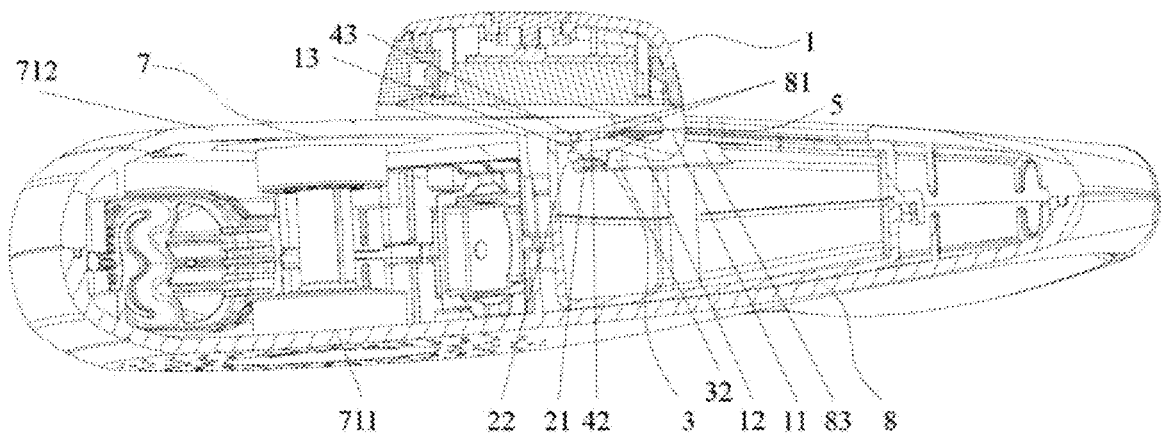
FIG. 14 is a sectional front view of FIG. 11 along the direction of C-C.
Figure 15:
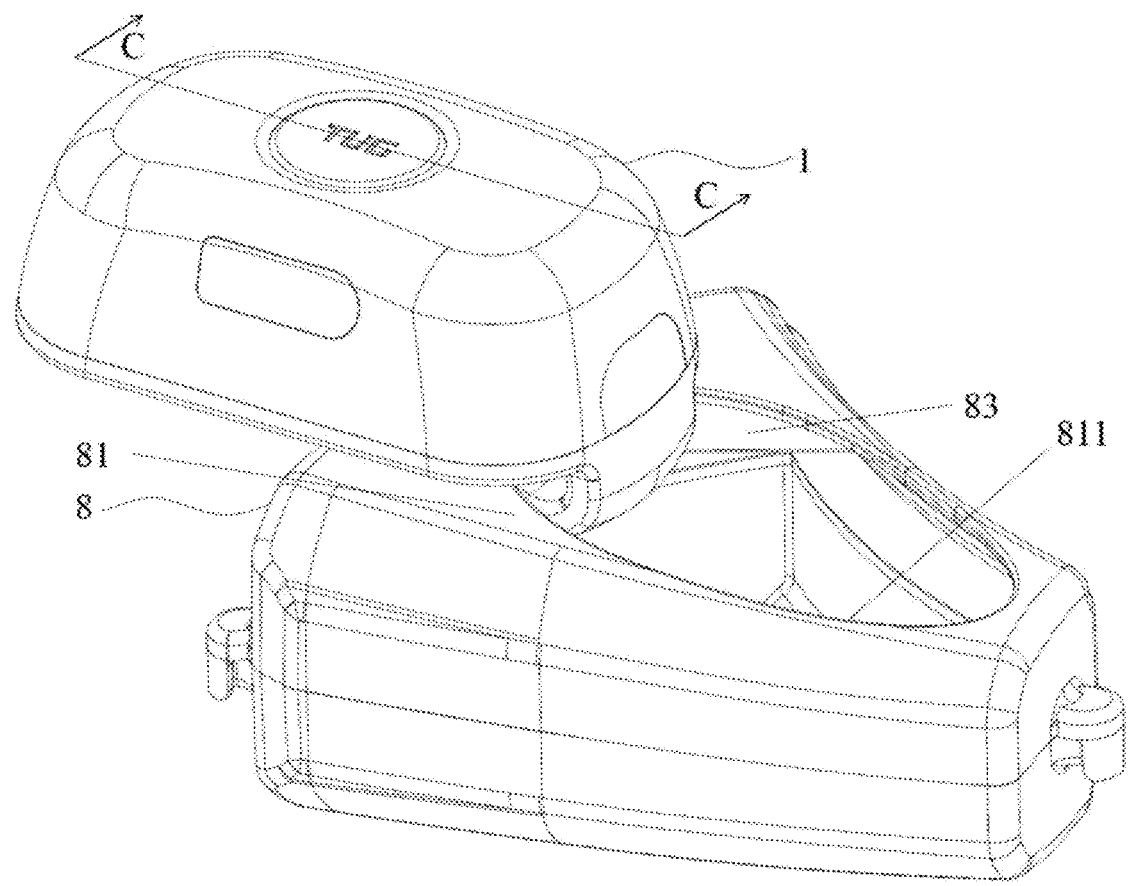
FIG. 15 is a schematic diagram of the assembly structure of the storage inner shell of the pet leash rope and the installation structure of the detachable device for pet products in the embodiments.
Figure 16:
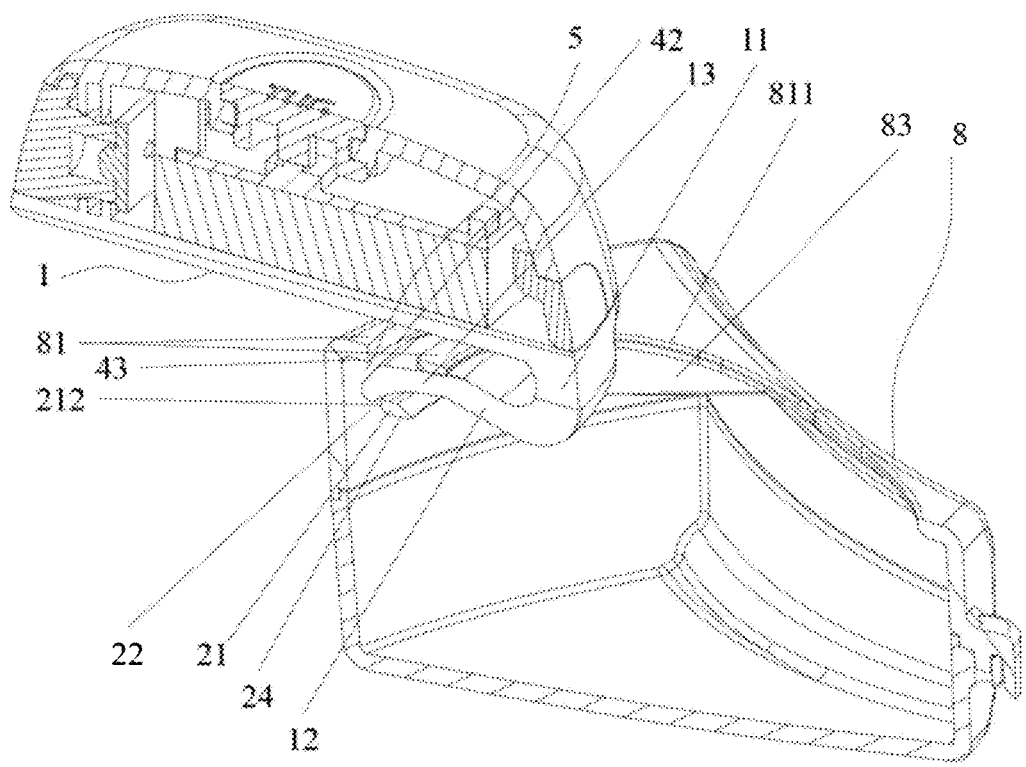
FIG. 16 is a sectional structural schematic diagram of FIG. 15 along the direction of C-C.
Figure 17:
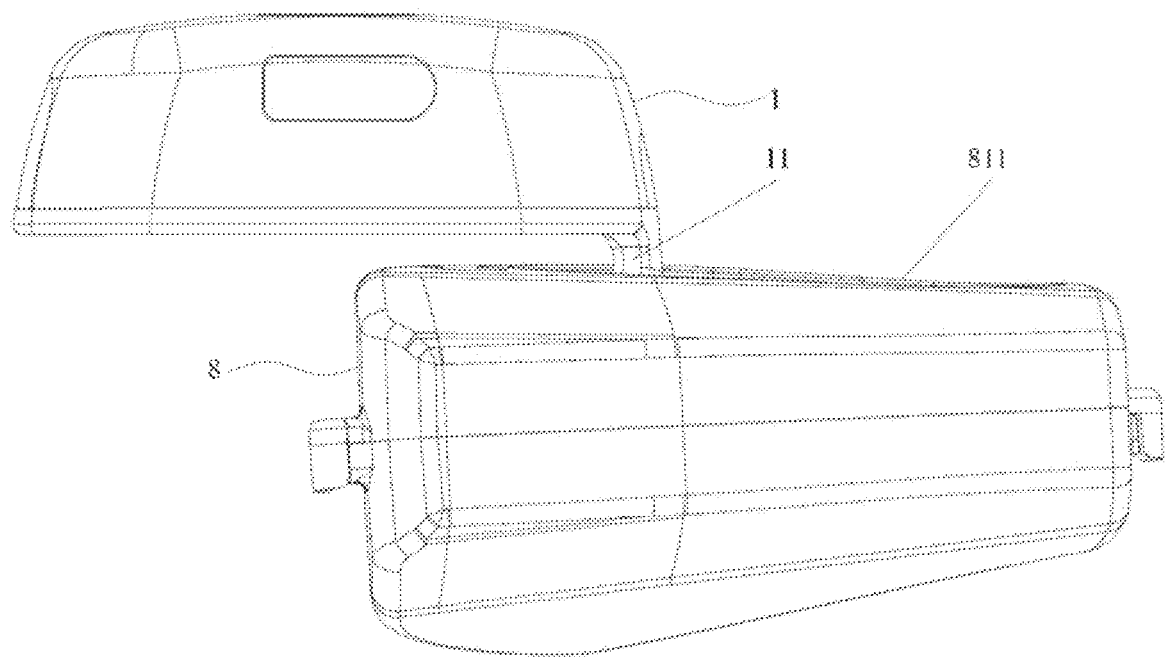
FIG. 17 is a front view of the assembly structure of the storage inner shell of the pet leash rope and the installation structure of the detachable device for pet products in the embodiments.
Figure 18:
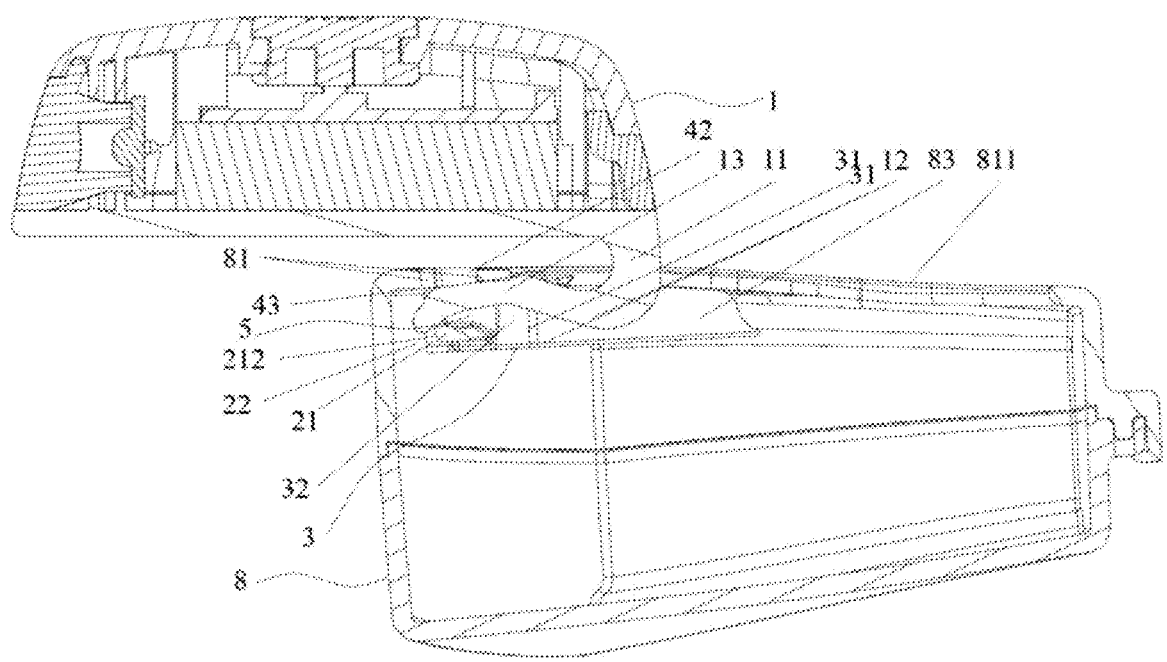
FIG. 18 is a sectional front view of FIG. 15 along the direction of C-C.

Please refer to FIGS. 2, 4, and 6. As a preferred embodiment, the surface of the elastic protrusion 21 facing away from the installation base 2 has a curved transition surface 211. The curved transition surface 211 is connected to the protrusion end surface 212 at one end away from the installation base 2, and the other end of the curved transition surface 211 is connected to the top end surface 24 near the opening 31. In another embodiment, the elastic protrusion 21 extends obliquely upward from the intersection between the side wall 221 and the top end surface 24, simultaneously moving away from the opening 31 and the top end of the installation base, forming a cantilever beam structure on top of the through groove 22.

In this embodiment, the elastic protrusion 21 is located at one end of the internal storage space 5, away from the opening 31. Multiple first ribs 23 are spaced apart between the top end surface 24 of the installation base 2, the elastic protrusion 21, and the opening 31 in the internal storage space 5. The two ends of the first ribs 23 extend in the direction of the elastic protrusion 21 and the opening 31, respectively. The inner end surface 43 of the top cover 4 facing the installation base 2 has multiple second ribs 41, which are parallel to and correspond to the multiple first ribs 23. A mating insertion channel is formed between the opening 31, the first ribs 23, the second ribs 41, the curved transition surface 211, and the through groove 22 in the internal storage space 5, matching the overall shape of the S-shaped winding of the elastic hook.

In this embodiment, one end of the second rib 41 is positioned near the opening 31 on the inner end surface 43, and the other end of the second rib 41 extends directly above the elastic protrusion 21. The second bend portion 13 facing the first rib 41 has a first inclined surface 131, and the end of the second rib 41 away from the opening 31 has a second inclined surface 411 that matches the first inclined surface 131. As a preferred embodiment, there is a curved transition between one end of the second rib 41 near the opening 31 and the inner end surface 43, and there is a curved transition between the middle part of the second rib 41 along its axial direction and the second inclined surface 411. As a preferred embodiment, the distance between one end of the second inclined surface 411 near the opening 31 and the inner end surface 43 is smaller than the distance between the other end of the second inclined surface 411 away from the opening 31 and the inner end surface 43.

In this embodiment, the length of the first rib 23 is shorter than that of the second rib 41, and one end of the first rib 23 away from the opening 31 abuts against the curved transition surface 211 or is flush with the curved transition surface 211. In a more preferred embodiment, there are four first ribs 23 and four second ribs 41, with two of the first ribs 23 located in the middle of the top end surface 24 abutting against the curved transition surface 211, and the other two first ribs 23 located on the sides of the top end surface 24 aligning with the intersection between the curved transition surface 211 and the top end surface 24.

In this embodiment, the groove 22 extends away from the opening 31 and passes through the side frame wall 32 facing the opening 31, forming a through-hole connecting the outer side of the side frame 3 away from the opening 31 and the protrusion end surface 212, thus creating a demolding channel.

Please also refer to FIGS. 2-4, 6. In this embodiment, the top cover 4, side frame 3, and mounting socket 2 are integrally formed through injection molding. The top cover 4 has a mold groove 42 that passes through it and is used for mold release during injection molding. As one embodiment, the top cover 4, side frame 3, mounting socket 2, elastic protrusion 21, first rib 23, and second rib 41 are all formed through injection molding as an integrated unit.

Please also refer to FIGS. 1-10. The present utility model also provides a pet leash 6, including a strap traction portion 61 and a collar connection portion 62 installed at one end of the strap traction portion 61. The collar connection portion 62 is equipped with an elastic hook that can be detachably connected to a pet collar. In this embodiment, after one end of the strap traction portion 61 passes through the connection loop of the collar connection portion 62, it can be detachably fastened to the strap traction portion 61 through a buckle structure. The other end of the strap traction portion 61 forms a handle for gripping. The pet product detachable device 1 installation structure described above is also included. The pet product detachable device 1 installation structure further includes an elastic clamping portion 63 set opposite the mounting socket 2. The top end surface 24 is located on the outer side of the mounting socket 2 away from the elastic clamping portion 63. One end of the mounting socket 2 and the elastic clamping portion 63 are connected as a whole through a U-shaped bending portion 65, and multiple anti-slip ribs 64 are spaced apart on the corresponding inward-facing surfaces of the mounting socket 2 and the elastic clamping portion 63. The mounting socket 2 and the elastic clamping portion 63 can be detachably mounted on the strap traction portion 61 by the elastic closure action of the U-shaped bending portion 65. In this embodiment, the anti-slip ribs 64 are parallel to the strap traction portion 61, and they are arranged in an alternating pattern between the corresponding anti-slip ribs 64 of the mounting socket 2 and the elastic clamping portion 63 to enhance the clamping effect of the mounting socket 2 and the elastic clamping portion 63 on the strap traction portion 61.

Please also refer to FIGS. 11-20. The present utility model further provides a pet leash 7, including: an outer shell 71 composed of a bottom shell 711 and a top shell 712; a leash retracting device 72 located inside the outer shell 71. It also includes a storage inner shell 8 located inside the outer shell 71. The storage inner shell 8 is preferably detachably connected to the outer shell 71 through a buckle structure or can be detachably connected to the outer shell 71 through screws and threaded holes. The storage inner shell 8 includes the pet product detachable device 1 installation structure described above. In this embodiment, the storage inner shell 8 is composed of an upper shell and a lower shell. The top cover 4 is replaced by a top cap 81 (i.e., the top cap of the upper shell) facing the top shell 712, and the top end of the side frame 3 is suspended and connected to the bottom side of the top cap 81, away from the top shell 712.

In another embodiment, the suspension mounting plate can be directly omitted, leaving only a pair of elastic protrusions 21 located at the original position, i.e., the axial ends correspondingly connected to a pair of side frame walls 32 of the side frame 3. They are used to interlock the first bending portion 12, that is, the elastic protrusions 21 covering the bottom end of the side frame 3 away from the top shell 712 directly serve as the mounting socket. The internal storage space 5 is surrounded by the top cap 81 of the storage inner shell 8 facing the top shell 712, the side frame 3, and the elastic protrusions 21. The top cap 81 of the storage inner shell 8 facing the top shell 712 is provided with a first positioning port 811, and the top shell 712 facing the first positioning port 811 is provided with a second positioning port 713. The S-shaped winding of the elastic hook can pass through the second positioning port 713 and then the first positioning port 811 from the outer side of the top shell 712 towards the back of the bottom shell 711, extend into the storage inner shell 8, and insert into the internal storage space 5 through the opening 31. It is then locked by abutting against the elastic protrusion 21 with the end of the second bending portion 13 of the elastic hook, achieving interlocking and securely fastening the detachable device 1 onto the top cap 81 of the top shell 712. As one embodiment, the first positioning port 811 and the second positioning port 713 are both elliptical in shape, allowing the garbage bag to be guided outward from the storage inner shell 8 through the elliptical and opposing first positioning port 811 and second positioning port 713 when pulled.

Please also refer to FIGS. 12, 14, 16, 18-20. In this embodiment, a pair of side frame walls 32 of the side frame 3, located on both sides of the opening 31, are correspondingly equipped with a pair of hanging guide ribs 83 suspended and connected to the bottom side of the top cap 81 away from the top shell 712. One end of the guide rib 83 is connected to the corresponding side frame wall 32 near the opening 31, and the other end of the guide rib 83 extends away from the corresponding side frame wall 32 towards the direction away from the opposite side frame wall 32. In other words, the extension direction of the guide rib 83 forms an inclined angle with the axial direction of the corresponding side frame wall 32, and the angle between the guide rib 83 and the side frame 3 is an obtuse angle greater than 90 degrees and less than 180 degrees. A pair of guide ribs 83 form a trumpet-shaped guiding structure, which can guide the S-shaped winding body that extends into the storage inner shell 8 and inserts into the internal storage space 5 through the opening 31, and finally accurately insert it into the internal storage space 5.

Figure 19:
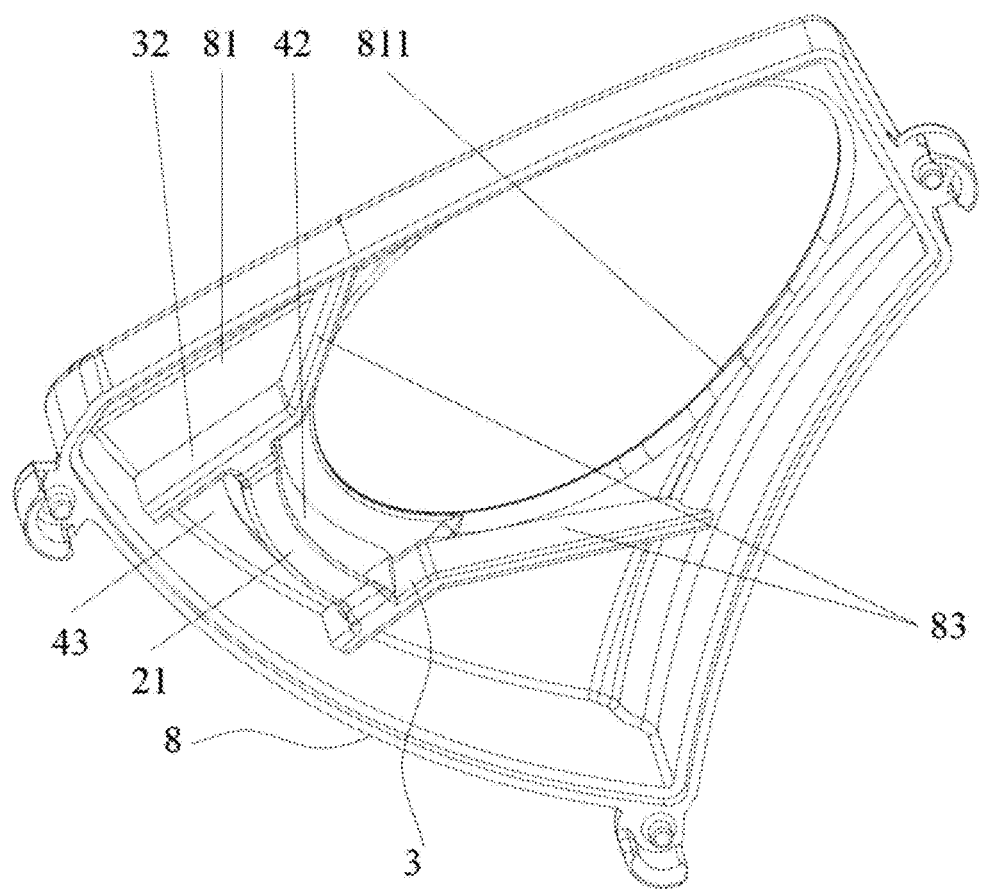
FIG. 19 is a three-dimensional structural schematic diagram of the upper shell of the storage inner shell of the pet leash rope in the embodiments.
Figure 20:
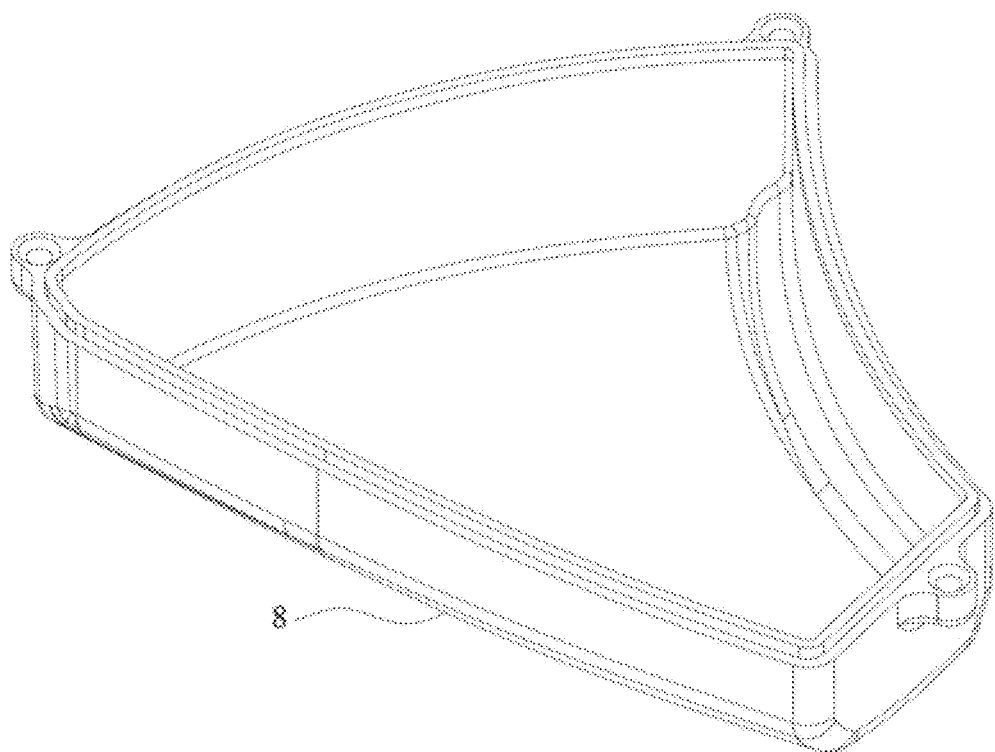
FIG. 20 is a three-dimensional structural schematic diagram of the lower shell of the storage inner shell of the pet leash rope in the embodiments.

Please refer to FIG. 19. In this embodiment, the connection between the hanging guide ribs 83 and the top cap 81 is reinforced. The width of the elastic protrusion 21 (i.e., the distance in the direction from the opening 31 to the side frame wall 32 facing the opening 31, within the internal storage space 5 and the side frame 3) is smaller than the length of the first bending portion 12 (i.e., the distance from the end of the first bending portion 12 away from the elastic extension portion 11 to the length of the elastic extension portion 11). The elastic protrusion 21 is provided with a through groove 22 that passes through the hanging elastic protrusion 21 and extends through the internal storage space 5. The elastic protrusion 21 is located at the intersection of the side wall 221 and the top end of the elastic protrusion 21, and the protrusion end surface 212 is located within the groove 22.

In one embodiment, the side frame walls 32 facing the opening 31 can be omitted, that is, the side frame 3 is formed by a pair of spaced-apart side frame walls 32 located on both sides of the opening 31 and suspended and connected to the bottom side of the top cap 81 away from the top shell 712. The complete structure of the side frame 3 is formed by directly connecting the corresponding side frame walls 32 of the storage inner shell 8 with the pair of side frame walls 32 located on both sides of the opening 31. The upper shell of the storage inner shell 8, the side frame 3 (with the possibility of omitting the side frame walls 32 facing the opening 31 and retaining only the pair of side frame walls 32 located on both sides of the opening 31), the guide ribs 83, the hanging plate (with the possibility of omitting the elastic protrusions 21 and retaining only the connection between the pair of side frame walls 32 of the side frame 3), and the elastic protrusions 21 are integrally molded by injection molding. The top shell 712 of the outer shell 71 is provided with a mold groove 42 that passes through the top shell 712 and is used for mold release during injection molding. In other embodiments, the installation structure of the detachable pet product device 1 provided by the present utility model can also be applied to other pet products such as pet collars, in addition to the aforementioned pet leash 6 and pet leash 7.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A pet leash comprising:
a casing composed of a bottom shell and a top shell;
a retractable leash device located inside the casing, wherein the retractable leash device includes a storage inner shell located inside the casing,
the storage inner shell further comprising a detachable pet article mounting structure, further comprising:
a detachable device;
an elastic hook, further comprising:
an elastic extension portion mounted on the detachable device and extending outward away from the detachable device;
a first bending portion located at the end of the elastic extension portion, bending towards the direction close to the detachable device; and
a second bending portion located at the end of the first bending portion, bending towards the direction away from the detachable device, wherein the second bending portion and the first bending portion are connected to form an S-shaped winding structure;
an installation seat;
a side frame, located at the top of the installation seat, with an opening on one side matching the size of the S-shaped winding structure;
a top cover, covering the top of the side frame, forming an internal accommodating space between the top cover, the side frame, and the installation seat; and
an elastic protrusion, located at the top of the installation seat within the internal accommodating space, where the S-shaped winding structure is configured to be inserted through the opening into the internal accommodating space and interlock with the elastic protrusion through the end of the second bending portion facing away from the first bending portion;
wherein the top cover is used as the top end cover of the storage inner shell facing the top shell,
the top end of the side frame is suspended and connected to the back side of the top end cover away from the top shell,
the installation seat is a covering mounted on the bottom end of the side frame, away from the top shell,
the elastic protrusion is located at the top end of the installation seat, the internal storage space is enclosed by the top end cover of the storage inner shell facing the top shell, the side frame, and the suspension seat, the top end cover of the storage inner shell facing the top shell is provided with a first clearance port, and the top shell is provided with a second clearance port corresponding to the first clearance port, the S-shaped winding body can pass through the second clearance port and then the first clearance port, extending into the storage inner shell from the opening and inserting into the internal storage space, and the S-shaped winding body is interlocked with the elastic protrusion by abutting the end of the second bending portion away from the first bending portion, tightly securing the detachable pet article mounting structure onto the top end cover of the top shell.

* * * * *